United States Patent [19]

Maruzeni et al.

[11] Patent Number: 4,837,041
[45] Date of Patent: Jun. 6, 1989

[54] BLOOMING RESISTANCE IMPROVER

[75] Inventors: Shouji Maruzeni, Tokyo, Japan; Toshimichi Yanagihara, deceased, late of Tokyo, Japan, by Hiromi Yanagihara, legal representative

[73] Assignee: Asahi Denka Kogyo Kabushiki Kaisha, Tokyo, Japan

[21] Appl. No.: 21,968

[22] Filed: Mar. 5, 1987

[51] Int. Cl.$^4$ .................................................. A23D 5/00
[52] U.S. Cl. ................................... 426/611; 426/601; 426/607
[58] Field of Search ................. 426/607, 613, 611, 612

[56] References Cited

U.S. PATENT DOCUMENTS

| 4,456,627 | 6/1984 | Van Heteren et al. | 426/603 |
| 4,464,411 | 8/1984 | Herzing et al. | 426/613 |

FOREIGN PATENT DOCUMENTS

| 118848 | 5/1987 | Japan . | |
| 2143637 | 6/1987 | Japan | 426/603 |

OTHER PUBLICATIONS

Patent Abstracts of Japan, vol. 9, No. 17 (C-262)[1740], Jan. 24, 1985.
Patent Abstracts of Japan, vol. 10, No. 199 (C-359)[2255], Jul. 11, 1986.
Patent Abstracts of Japan, vol. 10, No. 90 (C-337)[2147], Apr. 8, 1986.
B. W. Minifie: "Chocolate, Cocoa and Confectionary", 1980, p. 213, AVI Publishing Co., Inc., Westport, Connecticut, U.S.

*Primary Examiner*—Donald E. Czaja
*Assistant Examiner*—Celine T. Callahan
*Attorney, Agent, or Firm*—Frishauf, Holtz, Goodman & Woodward

[57] ABSTRACT

The blooming resistance improver of the present invention comprises an oleaginous composition containing 80 to 99% (by weight; the same will apply hereinafter) of fat(s) and/or oil(s), which contain 5% or more of fatty acid group(s) having 20 or more carbon atoms and show solid fat contents of 10% or above and 5% or above at 20° C. and 25° C., respectively, and a rising melting point of 25° C. or above, and 1 to 20% of polyglycerol fatty acid ester(s). It exerts a remarkably high effect of inhibiting blooming on chocolates.

6 Claims, No Drawings

BLOOMING RESISTANCE IMPROVER

BACKGROUND OF THE INVENTION

1. Field of the Invention:

This invention relates to a blooming resistance improver which is highly useful in inhibiting blooming of chocolate products. A combination of the blooming resistance improver of the present invention with a tempered cacao fat substitute can afford a cacao fat substitute composition having an improved blooming resistance.

2. Description of the Prior Art:

Most of consumers' complaints about chocolate products are directed to blooming, in particular, to fat-blooming.

Conventional methods for the inhibition of blooming of chocolate products comprise using various additives, for example, fats and oils such as milk fat, milk fat hardened oil, high-melting oil obtained by fractionating milk fat and hardened peanut oil, sucrose fatty acid esters, sorbitol fatty acid esters and polyoxyethylenemonostearate. Among these materials, however, only milk fat can be utilized in practice. Moreover even the milk fat can give an unsatisfactory effect of inhibiting blooming.

SUMMARY OF THE INVENTION

It is an object of the prsent invention to provide a blooming resistance improver which can exert a much higher effect of inhibiting blooming than milk fat.

The blooming resistance improver of the present invention, by which the abovementioned object can be achieved, comprises an oleaginous composition containing 80 to 99 % (by weight; the same will apply hereinafter) of fat(s) and/or oil(s), which contain 5 % or more of fatty acid group(s) having 20 or more carbon atoms and show solid fat contents of 10 % or above and 5 % or above at 20° C. and 25° C., respectively, and a rising melting point of 25° C. or above, and 1 to 20 % of polyglycerol fatty acid ester(s). Still preferably, it comprises an oleaginous composition comprising 85 to 98 % of fat(s) and/or oil(s), which contain 15 % or more of fatty acid group(s) having 20 or more carbon atoms and show solid fat contents of 30 % or above and 20 % or above at 20° C. and 25° C., respectively, and a rising melting point of 30° to 45° C., and 2 to 15 % of polyglycerol fatty acid ester(s).

DETAILED DESCRIPTION OF THE INVENTION

Now the blooming resistance improver of the present invention will be described in detail.

The fats and oils to be used in the present invention should meet the requisites on fatty acid group(s), solid contents and rising melting point as specified above. A preferable example thereof is hydrogenated rapeseed oil. A mixture of fats and/or oils may be employed so far as it meets the above requisites. When fat(s) and/or oil(s) which do not meet the above requisites or when the contents of said fat(s) and/or oil(s) are outside the range as specified above, no satisfactory effect of improving blooming resistance can be observed, which makes it impossible to achieve the object of the present invention.

An example of the polyglycerol fatty acid ester(s) to be used in the present invention is a polyglycerol fatty acid ester wherein four or more moles in average of fatty acid(s) are bound to polyglycerol having five or more in average of hydroxyl groups. Examples of the fatty acids constituting said polyglycerol fatty acid ester are saturated or unsaturated fatty acids having up to 24 carbon atoms as well as citric, tartaric, succinic, maleic and lactic acids.

It is preferable to employ condensed polyglycerol ricinoleate at least some portion of the polyglycerol fatty acid ester as described above. The condensed polyglycerol ricinoleate is preferably used in an amount of 1 to 10 % of the polyglycerol fatty acid ester.

It is preferable to add the blooming resistance improver of the present invention to a chocolate dough to give a content of 0.5 to 8 %. Although the blooming resistance improver of the present invention alone can exert a satisfactory effect, milk fat may be further added if required. In this case, it is preferable to adjust the total content of the improver and milk fat to 0.5 to 8 %.

The blooming resistance improver of the present invention is particularly useful in producing a substitute composition for cacao fat of an improved blooming resistance by blending with a tempered cacao fat substitute obtained from, for example, shea fat, sal fat, illipe fat or fractionated palm fat.

For example, a composition can be produced by blending 40 to 95 % of a cacao fat substitute comprising 50 % of fractionated sal and shea fats or a mixture of fats and/or oils and 50 % of fractionated palm fat and 5 to 60 % of the blooming resistance improver of the present invention.

The substitute composition for cacao fat as described above can be combined with cacao fat and blended into a chocolate dough to give the total content of 25 to 35 %.

To further illustrate the present invention, and not by way of limitation, the following Examples will be given.

Example 1

An oleaginous composition comprising 90 % of hardened high-erucic rapeseed oil (I.V.: 74.3, m.p.: 35.4° C.), 7 % of polyglycerol stearate and 3 % of condensed polyglycerol ricinoleate was prepared to give a blooming resistance improver 1. Table 1 shows the analytical data of the blooming resistance improver 1 thus obtained.

With the use of the blooming resistance improver 1, a chocolate of the composition (1), as shown in Table 2, was produced and subjected to a blooming resistance test. Table 3 shows the result.

Prior to the blooming resistance test, the chocolate was tempered in an appropriate manner, molded and aged at 20° C. for two weeks. The test was carried out by allowing the chocolate to stand at 20° C. for 12 hours and then at 32° C. for 12 hours repeatedly and observing the blooming of the same.

For comparison, a chocolate produced in the same manner as the one described above except that the blooming resistance improver 1 was replaced by milk fat was subjected to the same blooming resistance test (Comparative Example 1). Table 3 shows the result.

Example 2

An oleaginous composition (blooming resistance improver 2) comprising 65 % of hardened high-erucic oil (I.V.: 73.2, m.p.: 36.0° C.), 20 % of hardened rice bran oil, 13 % of polyglycerol stearate and 2 % of condensed polyglycerol ricinoleate was prepared. Table 1 shows the analytical data of the blooming resistance improver 2.

With the use of the blooming resistance 2 thus obtained, a chocolate of the composition (2), as shown in Table 2, was produced and subjected to the same blooming resistance test as the one described in Example 1. Table 3 shows the result.

For comparison, a chocolate produced in the same manner as the one described above except that the blooming resistance improver 2 was replaced by milk fat was subjected to the same blooming resistance test as the one described in Example 1. Table 3 shows the result.

TABLE 1

|  | Blooming resistance improver 1 | Blooming resistance improver 2 |
|---|---|---|
| M. P. | 36.5° C. | 37.3° C. |
| I. V. | 66.9 | 62.9 |
| SFC (%) | | |
| 20° C. | 59.8 | 56.0 |
| 25° C. | 50.0 | 47.5 |
| 30° C. | 30.7 | 28.0 |
| Fatty acid composition (%) | | |
| 14:0 | 0.2 | 0.2 |
| 16:0 | 4.3 | 6.7 |
| 18:0 | 9.7 | 10.3 |
| 18:1 | 38.1 | 33.1 |
| 18:2 | 1.1 | 2.8 |
| 20:0 | 1.0 | 0.8 |
| 20:1 | 7.3 | 4.8 |
| 22:0 | 2.6 | 1.6 |
| 22:1 | 35.7 | 26.5 |

TABLE 2

|  | Ex. 1 Composition (1) | Ex. 2 Composition (2) |
|---|---|---|
| sugar | 50% | 45% |
| cacao mass | 35% | 20% |
| cacao fat substitute | 10% | 17.5% |
| nonskim milk powder | — | 15% |
| blooming resistance improver | 4.5% | 2.0% |
| lecithin | 0.5% | 0.5% |

TABLE 3

| Composition 1 | No. | No. of cycles* | | | | | | | | | | | | | | | |
|---|---|---|---|---|---|---|---|---|---|---|---|---|---|---|---|---|---|
| | | 0 | 2 | 4 | 6 | 8 | 10 | 12 | 14 | 16 | 18 | 20 | 25 | 30 | 35 | 40 | 45 | 50 |
| (1) | Ex. 1 | − | − | − | − | − | − | − | − | − | − | − | − | − | − | − | ± | + |
| | Comp. Ex. 1 | − | − | − | − | − | − | − | ± | + | ++ | | | | | | | |
| (2) | Ex. 2 | − | − | − | − | − | − | − | − | − | − | − | − | − | − | ± | + | ++ |
| | Comp. Ex. 2 | − | − | − | − | − | − | − | − | ± | + | ++ | | | | | | |

*−: no change;
±: slight blooming;
+: obvious blooming; and
++: remarkable blooming.

Thus the blooming resistance improver of the present invention exerts a remarkably high effect of inhibiting blooming on chocolate products.

What is claimed is:

1. A blooming resistance improver for chocolates which comprises an oleaginous composition containing 80 to 99% by weight of at least one component selected from the group consisting of fats, oils and mixtures of fats and oils, which contain 5% or more fatty acid group(s) having 20 or more carbon atoms and solid fat contents of 10% or above and of 5% or above at 20° C. and 25° C., respectively, and a rising melting point of 25° C. or above, and 1 to 20% of at least one polyglycerol fatty acid ester, wherein 1 to 30% of said at least one polyglycerol fatty acid ester is condensed polyglycerol ricinoleate.

2. The blooming resistance improver for chocolates as set forth in claim 1, wherein said oleaginous composition contains 85 to 98% of said at least one component and said at least one component comprises 15% or more of fatty acid groups having 20 or more carbon atoms and solid fat contents of 30% or above and 20% or above at 20° C. to 25° C., respectively, and a rising melting point of 30 to 45° C., and 2 to 15% of at least one polyglycerol fatty acid ester, wherein 1 to 30% of said at least one polyglycerol fatty acid ester is condensed polyglycerol ricinoleate.

3. The blooming resistance improver for chocolates as set forth in claim 2, wherein said at least one polyglycerol fatty acid ester comprises an ester of saturated or unsaturated fatty acids having up to 24 carbon atoms and 1 to 30% of condensed polyglycerol ricinoleate.

4. The blooming resistance improver for chocolates as set forth in claim 3, wherein said ester of saturated or unsaturated fatty acids having up to 24 carbon atoms is an ester of citric acid, tartaric acid, succinic acid, maleic acid or lactic acid.

5. The blooming resistance improver for chocolates as set forth in claim 1, wherein said oleaginous composition comprises 90% of hardened high-erucic rapeseed oil as said at least one component, and 7% of polyglycerol stearate and 3% of condensed polyglycerol ricinoleate as said at least one polyglycerol fatty acid ester.

6. The blooming resistance improver for chocolates as set forth in claim 1, wherein said oleaginous composition comprises 65% of hardened high-erucic oil and 13% of polyglycerol stearate and 2% of condensed polyglycerol ricinoleate as said at least one polyglycerol fatty acid ester.

* * * * *